United States Patent [19]

Tsai et al.

[11] Patent Number: 5,320,816
[45] Date of Patent: Jun. 14, 1994

[54] PROCESS FOR ABSORPTION OF SULFUR DIOXIDE AND NITRIC OXIDE FROM FLUE GAS

[75] Inventors: Susan S. Tsai, Houston; Stephen A. Bedell, Lake Jackson; Larry H. Kirby, Lake Jackson; Aubrey J. Rhymes, Jr., Lake Jackson, all of Tex.; Richard D. Varjian, Midland, Mich.

[73] Assignee: The Dow Chemical Company, Midland, Mich.

[21] Appl. No.: 964,323

[22] Filed: Oct. 21, 1992

[51] Int. Cl.$^5$ ............................................. B01D 53/34
[52] U.S. Cl. .............................. 423/235; 423/243.07; 423/243.14; 204/130; 204/131; 204/151; 204/152
[58] Field of Search ............... 204/130, 131, 149, 151, 204/152; 423/235, 243.11, 243.07

[56] References Cited

U.S. PATENT DOCUMENTS

| | | | |
|---|---|---|---|
| 2,768,945 | 10/1956 | Shapiro | 204/72 |
| 3,723,264 | 3/1973 | Leduc et al. | 204/80 |
| 3,755,101 | 8/1973 | Rakoutz | 204/75 |

(List continued on next page.)

FOREIGN PATENT DOCUMENTS

| | | | |
|---|---|---|---|
| 3718691 | 9/1988 | Fed. Rep. of Germany | 423/243.07 |
| 54-39370 | 3/1979 | Japan | 423/243.07 |

OTHER PUBLICATIONS

Bedell et al., *Hydrocarbon Processing*, pp. 63–66, Jan. 1988.
Bedell et al., *I & EC Reseach*, vol. 27, No. 11, pp. 2092–2095, 1988.
Chang et al., paper from American Chemical Society Symposium Series 188, 1982, based on 181st Meeting of the American Chemical Society, Atlanta, Ga., Mar. 29–30, 1981.
*Chemical Abstracts*, No. 84:169057u, vol. 84, 1976.
*Chemical Abstracts*, No. 84:169058v, vol. 84, 1976.
*Chemical Abstracts*, No. 90:209418v, vol. 90, p. 346, 1979.
Hwang et al., *Techniques of Chemistry*, vol. VII: Membranes in Separation, pp. 146–150, 1984.
Tsai et al., paper presented at A.I.Ch.E Summer Meeting, Minneapolis, Minn. 1987.
Tsai et al., paper presented at A.I.Ch.E Summer Meeting, Denver, Colo., 1988.
Tsai et al., *Environmental Progress*, vol. 8, No. 2, pp. 126–129, May, 1989.
Tsai et al., paper presented at the Air and Waste Management Association 83rd Annual Meeting and Exhibition, Pittsburgh, Pa., Jun. 24–29, 1990.
Zabcik, paper presented at First Combined FGD and Dry SO$_2$ Control Symposium, Oct. 25–28, 1988, St. Louis, Mo.

*Primary Examiner*—John Niebling
*Assistant Examiner*—John S. Starsiak, Sr.

[57] ABSTRACT

The simultaneous abatement of NO and SO$_2$ in flue gas is provided by an absorption process and apparatus utilizing an absorbent composition comprising an aqueous solution of chelates and sulfite salts. Metal chelates oxidized to an inactive state are electrochemically reduced. In the electrochemical cell, nickel or stainless steel anode materials are stable and may be used in the place of platinum coated anode materials when the anolyte pH is maintained greater than 12. At these conditions, the anode is corrosion resistant with a long operating time between replacement. Ultrafiltration or Donnan dialysis may be used to separate the chelate sorbents from the waste salts to reduce the loss of expensive chelate sorbents. Alternatively, an anionic exchange membrane can be used to electrodialytically separate waste sulfur/nitrogen salts from the absorbent solution.

14 Claims, 2 Drawing Sheets

U.S. PATENT DOCUMENTS

| | | | |
|---|---|---|---|
| 3,932,585 | 1/1976 | Moriguchi et al. | 423/235 |
| 3,984,522 | 10/1976 | Saito et al. | 423/235 |
| 3,991,161 | 11/1976 | Saito et al. | 423/235 |
| 3,992,508 | 11/1976 | Saito et al. | 423/235 |
| 4,013,430 | 3/1977 | Adachi et al. | 95/180 |
| 4,044,101 | 8/1977 | Hisamatsu et al. | 423/235 |
| 4,055,623 | 10/1977 | Saitoh et al. | 423/235 |
| 4,079,118 | 3/1978 | Gorai | 423/235 |
| 4,081,509 | 3/1978 | Hishinuma et al. | 423/235 |
| 4,087,372 | 5/1978 | Saitoh et al. | 252/184 |
| 4,091,074 | 5/1978 | Gorai et al. | 423/235 |
| 4,126,529 | 11/1978 | DeBerry | 204/182.4 |
| 4,158,044 | 6/1979 | Takabatake et al. | 423/235 |
| 4,331,639 | 5/1982 | Hass et al. | 423/235 |
| 4,448,899 | 5/1984 | Hass | 521/32 |
| 4,559,144 | 12/1985 | Pfenninger | 210/638 |
| 4,592,814 | 6/1986 | Vaughan et al. | 204/78 |
| 4,597,954 | 7/1986 | Hass | 423/138 |
| 4,608,136 | 8/1986 | Vaughan et al. | 204/106 |
| 4,612,175 | 9/1986 | Harkness | 423/235 |
| 4,615,780 | 10/1986 | Walker | 204/182.4 |
| 4,643,886 | 2/1987 | Chang et al. | 204/129 X |
| 4,670,234 | 6/1987 | Hoelter | 423/235 |
| 4,708,854 | 11/1987 | Grinstead | 423/235 |
| 4,732,744 | 3/1988 | Chang | 423/235 |
| 4,814,051 | 3/1989 | Bedell et al. | 210/638 |
| 4,818,409 | 4/1989 | Puetter et al. | 210/638 |
| 4,820,391 | 4/1989 | Walker | 423/235 X |
| 4,891,205 | 1/1990 | Bedell | 423/576.6 |
| 4,921,683 | 5/1990 | Bedell | 204/149 X |
| 5,207,877 | 5/1993 | Weinberg et al. | 204/130 |

PROCESS FOR ABSORPTION OF SULFUR DIOXIDE AND NITRIC OXIDE FROM FLUE GAS

FIELD OF THE INVENTION

The present invention relates to a chelate/sulfite process for the absorption of sulfur dioxide ($SO_2$) and nitric oxide (NO) from flue or other combustion gases. More particularly the present invention relates to a process wherein the spent oxidized chelates are reduced in an electrochemical cell having stable, high current density electrodes and waste salts are separated from chelate sorbents by electrodialysis, Donnan dialysis or ultrafiltration.

BACKGROUND OF THE INVENTION

Emissions control of sulfur dioxide and nitric oxide in flue gas streams resulting from the combustion of carbon-based fuels in power plants is an advancing art. There is a burgeoning need for an efficient and inexpensive process for abating such pollutant gases to meet ever increasing environmental concerns and the growing need to utilize plentiful, but pollutant-producing fuels, such as coal, to replace diminishing petroleum reserves.

In a widely employed practice, sulfur dioxide-containing flue gases are scrubbed with an aqueous lime or limestone slurry. Sulfur dioxide is removed by precipitation of hydrated $CaSO_4$ and $CaSO_3$ salts. A common variation of this process utilizes $SO_2$ sorbents such as sodium carbonates to produce a bisulfite intermediate. The sorbent may be subsequently regenerated by contacting the bisulfite with lime or limestone. The insoluble calcium salts produced thereby are typically disposed of in landfills.

Metal chelates, and ferrous chelates in particular, have been introduced to address the problem of NO abatement such as, for example, in U.S. Pat. No. 4,732,744 to Chang et al.; No. 4,612,175 to Harkness et al.; No. 4,708,854 to Grinstead; No. 4,615,780 to Walker; and No. 4,126,529 to DeBerry. In these references, $SO_2$ is scrubbed concurrently by a $SO_2$ sorbent such as water soluble sulfite, bisulfite and carbonate salts. The $SO_2$ and NO are typically removed as a soluble sulfur/nitrogen salt waste stream. Separation of these byproduct salts from chelate sorbents also present in the waste steam is accomplished by various techniques such as, for example, in Chang by a crystallization separation process, in Walker and DeBerry by electrodialysis or in Grinstead by ultrafiltration or dialysis.

Related U.S. Pat. Nos. describing the use of chelate sorbents include No. 4,013,430 to Adachi et al.; No. 3,984,522 to Saito et al.; No. 4,044,101 and No. 4,081,509 to Hisamatsu et al.; No. 4,079,118 and No. 4,091,074 and No. 4,079,118 to Gorai; No. 4,158,044 to Takabatake et al.; No. 4,331,639; No. 4,448,899 and No. 4,597,954 to Hass; Nos. 3,991,161; 3,992,508; 4,055,623 and No. 4,087,372 to Saitoh et al.; and No. 3,932,585 to Moriguchi et al. Related articles include S. G. Chang et al., *American Chemical Society Symposium Series*, No. 188, (1982) and S. A. Bedell et al., *Hydrocarbon Processing*, Jan. 1988, pp. 63–66.

Electrochemical reduction of oxidized chelate absorbents is disclosed in several references. In DeBerry, the electrochemical cell comprises a series of compartments separated by a series of anionic and cationic membranes. Preferred anode electrodes are said to be made from non-corroding materials handling high current densities such as lead and lead alloys. In Walker, the electrochemical cell is said to comprise a stack of compartments separated by alternating bipolar and anionic selective membranes. Other references disclosing electrochemical reduction of chelates in a $SO_2$/NO abatement process include U.S. Pat. No. 4,607,234 to Hoelter; Japanese Patent JA-086017(05.02.76); Chemical Abstracts (CA) 84:169057u (Hasui, et al.); CA 84:169058v (Miki et al.); and CA 90:209418v (Sato et al.). See also, S. A. Bedell et al., *Industrial & Chemical Research* Vol 26, No. 11, (1988), pp. 2092–2095; Susan S. Tsai et al., *Environmental Progress*, May 1989, pp 126–129; S. S. Tsai et al., *Presentation Paper-American Institute of Chemical Engineers (AICHE)*, (1987); S. S. Tsai et al., *Presentation Paper-AICHE*, #81B, (1988); S. S. Tsai et al., *Presentation Paper-Air & Waste Management Assoc. Annual Meeting* 90-101.4, Jun. 24–29 (1990); and D. J. Zabcik, *Presentation Paper-Combined FGD and Dry $SO_2$ Control Symposium*, Oct. 25–28 (1988).

The use of a variety of electrode materials in various different electrochemical processes are described in several references. U.S. Pat. No. 4,814,051 to Bedell discloses platinized titanium or tantalum which have enhanced stability in an electrochemical cell used to regenerate an alkanolamine sorbent for $H_2S$. Other U.S. Pat. Nos. 2,768,945 to Shapiro; No. 4,592,814 and No. 4,608,136 to Vaughan et al.; and No. 3,723,264 to Leduc.

It is desirable that a process be devised for the efficient removal of $SO_2$ and NO from flue gas streams wherein the oxidized chelate absorbents may be reduced, in a simple, two-compartment electrochemical cell wherein the electrodes have high current densities and are stable in the operating environment. In addition, it is desirable that the chelate sorbents be separated from the waste salts for recycle to the absorber for lower operation costs and more efficient operation.

SUMMARY OF THE INVENTION

The present invention comprises a chelate/sulfites process for abating $SO_2$/NO from flue gases, wherein an electrochemical cell is utilized to reduce spent oxidized chelates. The invention is partially based on the discovery that an otherwise unstable nickel or stainless steel anode material is stable in the cell when a pH greater than 12 is maintained in the anode compartment and a cationic cell membrane is used. In addition, waste sulfur/nitrogen salts may be separated from the chelate sorbents by electrodialysis when an anionic exchange membrane is used in the cell or by ultrafiltration or Donnan dialysis.

In one embodiment, the present invention comprises a process for abating nitric oxide and sulfur dioxide from a flue gas. In one step, flue gas is contacted with an absorbent solution comprising a metal chelate and a sulfite salt to absorb sulfur dioxide and nitric oxide in the absorbent solution. In another step, the absorbent solution is directed to a cathode compartment of an electrochemical cell comprising an anode, preferably a nickel or stainless steel anode, in an anolyte solution in an anode compartment separated by a membrane, preferably a cationic exchange membrane, from a cathode in the cathode compartment. The anolyte solution preferably has a pH greater than 12 when the preferred nickel or stainless steel anodes are used. An electrical potential imposed across the anode and cathode reduces inactive oxidized chelates to an active state. In a further step, regenerated absorbent solution from the cathode compartment is recycled to the flue gas contacting step. The process may further comprise the step of adjusting the regenerated recycle absorbent to a pH of from about 3 to about 8.

The process preferably, but optionally, further comprises the steps of removing a side stream of the absorbent solution, separating the chelate sorbents from soluble waste sulfur/nitrogen salts to reduce the waste salt concentration in the absorbent solution and recycling the separated chelates to the absorber for reuse. In one aspect, the separating step comprises ultrafiltration when polymeric chelate sorbents having a molecular weight greater than about 500 are used. Ultrafiltration comprises the step of contacting the absorbent solution with a membrane permeable to molecules having a molecular weight of about 500 or less for a time sufficient to separate non-permeable chelate molecules from an absorbent solution filtrate.

In another aspect, the separating step preferably comprises Donnan dialysis when chelate sorbents having a molecular weight less than about 500 are used. Donnan dialysis comprises the steps of contacting one side of a strong dialysis anionic exchange membrane with the absorbent solution and contacting another side of the membrane with a dialyzer, preferably a sulfite dialyzer, for a sufficient time to effect exchange of waste salt anions for sulfite anions.

In a further aspect, soluble sulfur/nitrogen salt anions are preferably electrodialytically separated from the absorbent solution when an electrodialysis anionic exchange membrane is used in the electrochemical cell. A preferred anode material is platinum coated titanium or tantalum.

In another embodiment, an apparatus for abating nitric oxide and sulfur dioxide from flue gases comprises an absorber column; an absorbent solution comprising an aqueous solution of metal chelate and a water soluble sulfite; and an electrochemical cell comprising a cathode in a cathode compartment separated preferably by an cationic exchange membrane from an anode in an anode compartment, wherein the anode preferably comprises nickel or stainless steel and an anolyte is held at a pH of greater than 12.

In one aspect, the apparatus preferably further comprises a housing and an ultrafiltration membrane when polymeric chelate sorbents having a molecular weight greater than about 500 are used.

In another aspect, the apparatus further comprises a housing, a Donnan dialysis anionic exchange membrane and a dialyzer, preferably a soluble sulfite, when chelate sorbents having a molecular weight less than about 500 are used.

In a further aspect, the electrochemical cell comprises an anionic exchange membrane and the anode preferably comprises platinum coated titanium or tantalum.

BRIEF DESCRIPTION OF THE DRAWINGS

FIG. 1 represents a schematic diagram of a process used to simultaneously treat flue gases in accordance with the present invention wherein an optional ultrafiltration unit is used. A flue gas stream 12 may be initially cooled (if necessary) to a temperature of from about 25° C. to about 60° C. in a contacting vessel 14 by a closed loop water quench 18 including a pump (not shown). A cooled gas stream 16 enters an absorber column 10 in counter-current flow with an absorbent stream 11. The absorbent stream 11 is at a temperature of from about 5° C. to about 80° C. and a pH of from about 3 to about 8. A purified gas stream 24 exits the absorber 10 for venting into the atmosphere or directing to other processing units. The absorber column 10 may be packed with a packing material of any various conventional shapes, utilize a spray design or contain trays of appropriate spacing as is known in the art. An oxidized chelate absorbent stream 26 is pumped from absorber 10 by a pump 28 to an electrochemical cell 30 to reduce the oxidized chelates. The electrochemical cell 30 has a cathode compartment 34 and an anode compartment 36 separated by an exchange membrane 38. In the cathode compartment 34, the chelates are reduced by a cathode reaction. A closed loop comprised of a feed tank 40 and a pump 42 circulates anolyte through the anode compartment 36. Anolyte solution from anode compartment 36 is circulated to the feed tank 40 through line 35. A side stream of the anolyte in line 35 is preferably withdrawn as a purge in line 37. Fresh anolyte solution is added to the feed tank 40 through line 39. The reduced chelate absorbent stream 11 is recirculated into contact with the flue gas 12 in the absorber column 10. A side stream 32 is optionally provided to remove byproduct salts in the absorbent stream by blowdown. Side stream 32 comprises polymeric chelate sorbents and waste salts removed in a continuous manner by optional pump 50 to a depressurizing tank 52 wherein any dissolved gases are is then circulated via line 55 through separator 56 containing filtration membrane 58. Liquid 60 not passing through the membrane (containing primarily dissolved chelates) is recycled to the absorber 10. Filtrate passing through the membrane 58 is disposed of.

DETAILED DESCRIPTION OF THE INVENTION

Figure 1:
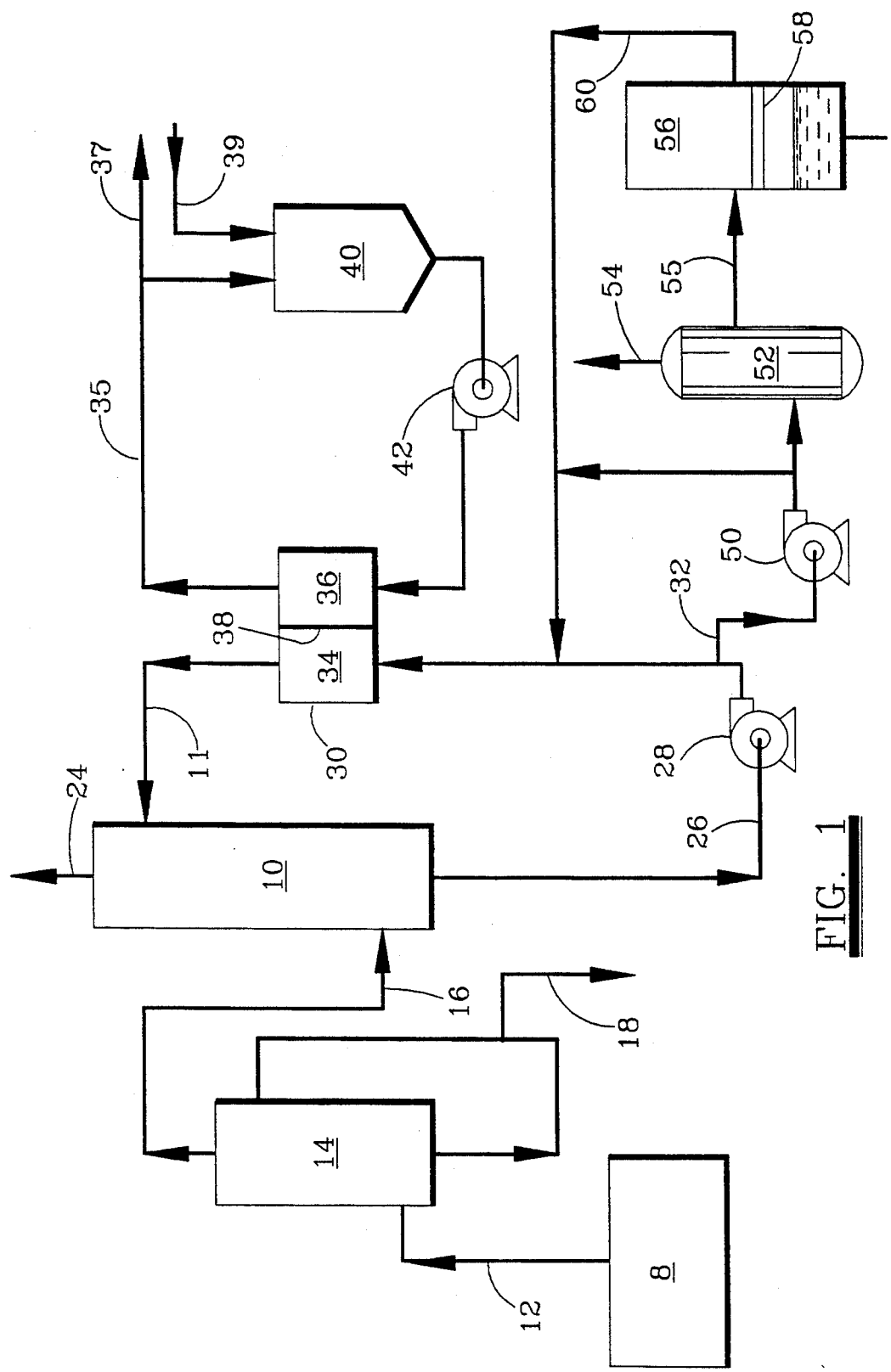
Figure 2:
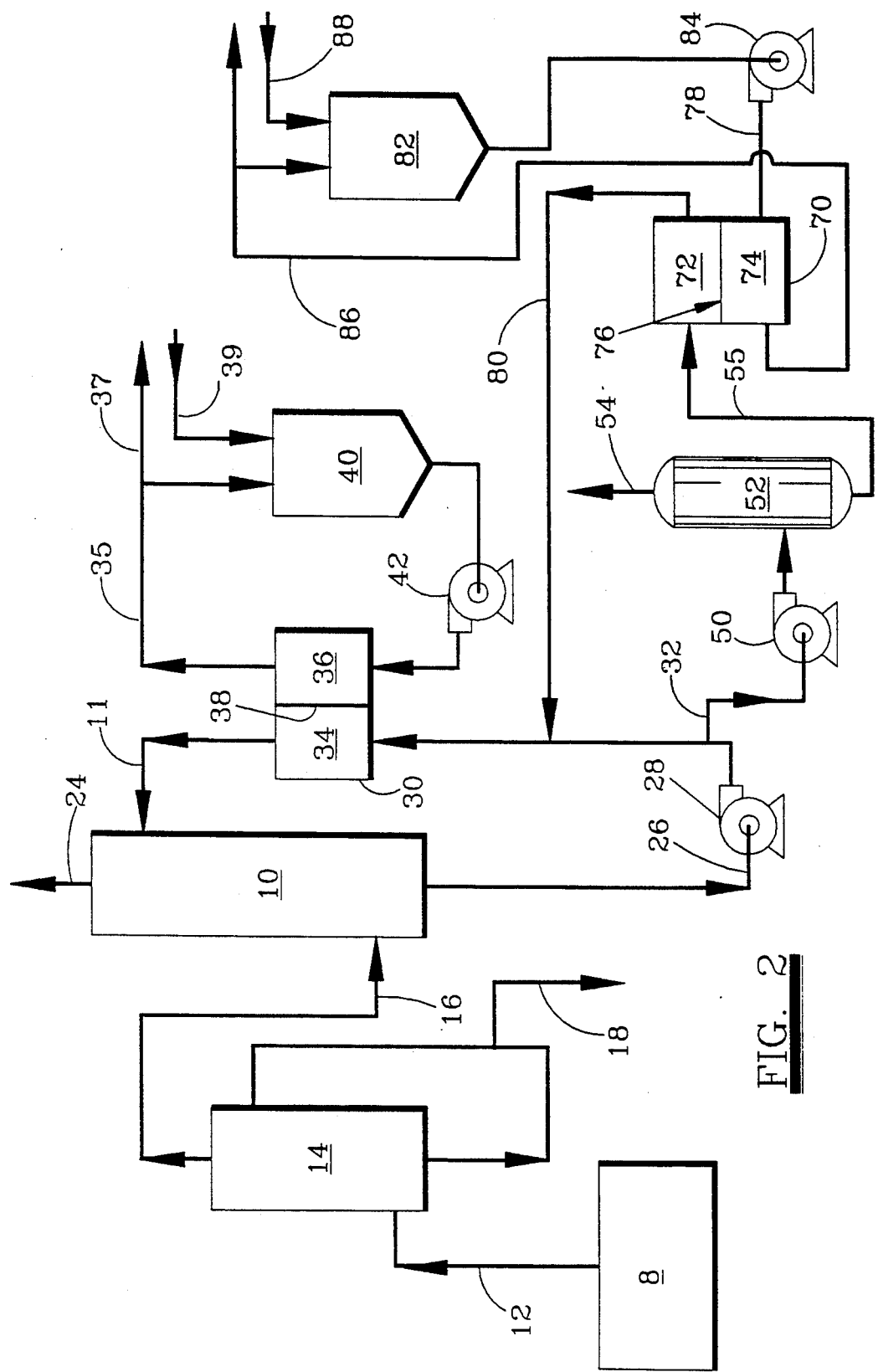
FIG. 2 represents a schematic diagram of the process of FIG. 1, wherein like reference numerals are used for like parts, except that an optional Donnan dialysis separator unit 70 is used in the place of the ultrafiltration separator 56. The side stream 32 comprising chelate sorbents is directed to depressurization tank 52 (if necessary), but then via line 55 to the dialysis unit 70 comprising compartments 72 and 74 separated by anionic membrane 76. Absorbent feed solution 32 is circulated through feed compartment 72 countercurrently with respect to a sulfite dialyzing solution stream 78 circulated through the dialyzer compartment 74. Dialysate stream so having a reduced waste salt concentration is recycled to absorber 10. A dialyzer circulating loop comprises tank 82, pump 84, recycle/purge line 86 and makeup line 88.

The process of the present invention provides for the simultaneous absorption of nitric oxide (NO) and sulfur dioxide ($SO_2$) from flue gases and separation of chelate sorbents from waste salts produced by the absorption process. It has been discovered that spent oxidized metal chelates may be electrochemically regenerated utilizing base metal electrodes which are stable over a long operating time if the anolyte solution is maintained at a pH of greater than 12. This obviates the need for expensive platinized electrodes in the cell. Ultrafiltration or Donnan dialysis may be used to separate the chelate sorbents from the waste salts for subsequent reuse. Alternatively, an anionic exchange membrane can be used in the cell to electrodialytically separate waste sulfur/nitrogen salts from the absorbent solution to reduce the loss of expensive chelate sorbents.

A suitable metal chelate is typically prepared by admixing a water soluble active metal salt with a water-soluble chelating agent. Soluble active metal salts include salts such as sulfate, acetate, oxalate, and the like of a metal. Representative metal ions are chromium, cobalt, copper, irom, lead, manganese, mercury, molybdenum, nickel, palladium, platinum, tin, titanium, tungsten, and vanadium Of these metals, copper, nickel and particularly iron are preferred.

The term "chelating agent" is well known in the art and references are made thereto for the purposes of this invention. Chelating agents useful in the present invention include those chelating or complexing agents which form a water-soluble chelate with one or more of the aforedescribed metals. Representative of low molecular weight chelating agents (e. g. having a molecular weight less than about 500) are the aminopolycarboxylic acids, including the salts thereof, nitrilotriacetic acid, N-hydroxyethylaminodiacetic acid and the polyaminocarboxylic acids including ethylenediamine-tetraacetic acid, N-hydroxyethylene diaminetriacetic acid, diethylene triaminepentaacetic acid, cyclohexanediaminetetraacetic acid, triethylenetetra-aminehexaacetic acid, and the like; aminophosphonic acids such as ethylenediamine tetra(methylenephosphonic acid), aminotri(methylenephosphonic acid), diethylenetriamine penta(methylenephosphonic acid); phosphonic acids such as 1-hydroxyethylidene-1,1-diphosphonic acid, 2-phosphonoethane-1,2-dicarboxylic acid; polyhydroxy chelating agents such as monosaccharides and sugars (e.g., disaccharides such as sucrose, lactose and maltose); sugar acids (e.g., gluconic or glucoheptanoic acid); other polyhydric alcohols such as sorbitol and mannitol; and the like. Of such chelating agents, the polyaminocarboxylic acids, particlarly ethylenediaminetetraacetic acid (EDTA), N-hydroxyethylethylenediaminetriacetic acid and nitrilotriacetic acid are most advantageously employed.

Most preferably, the low molecular weight metal chelate is the chelate of a ferrous ion with ethylenediaminetetraacetic acid, N-hydroxyethylethylenediaminetriacetic acid, or nitrilotriacetic acid.

High molecular weight, water soluble polymeric chelating agents may also be used. Any water soluble polymeric chelating agent (e. g. having a molecular weight greater than about 500) capable of chelating the polyvalent metal described above is suitable if the polymeric chelate does not interfere with the absorption reaction to an appreciable extent. Polymeric chelates comprising repeat units capable of chelating with metal ions include various amine-based polymers also comprising hydroxy and carboxy functionality and epoxide linkages. Such polymers may be made by various methods known in the art such as, for example, the condensation polymerization of ethyleneamines. Further details are given in Grinstead mentioned above which is hereby incorporated herein by reference. Preferred polymeric chelates have a molecular weight between about 500 and about 1,000,000, more preferably between about 1000 and about 500,000.

The metal chelate is typically present in the absorbent solution at a metal ion concentration greater than about 100 ppm with a chelating agent to metal ion molecular ratio of greater than or equal to one. The metal chelate is preferably present at a metal ion concentration of about 1,000 to about 10,000 ppm and a chelating agent to metal ion molecular ratio between 1.2 and 10.

When chelant to metal ion molecular ratio comprises excess chelant at a ratio of from about 1.2 to 10, preferably from about 2 to about 5, the metal chelate acquires enhanced stability. With enhanced stability, pH excursions resulting in metal salt precipitation are less likely to occur. In addition, excess chelant reactants can act as scavengers for flue gas streams containing contaminant metal ions. The presence of free metal ions can detrimentally catalyze the oxidation of sulfite reactants to waste sulfate salts and foul the cathode of the electrochemical cell.

Chelates absorb NO, i.e act as stoichiometric reactant to increase the solublity of NO in aqueous solution, in the presence of sulfite and/or bisulfite ions, collectively refered to herein as "sulfites." Such ions react with the NO-chelate complex to form iminodisulfonate, dithionate, sulfate and other sulfur-nitrogen salts and regenerate the chelate for NO absorption. Examples of suitable soluble sulfite salts include sodium, potassium, lithium, magnesium and ammonium sulfite and/or bisulfite. The concentration of sulfites generally effective, with the chelate, to absorb NO depends upon the absorption rate of NO the chelate solution and the concentration of $SO_2$ in the feed gas. Since $SO_2$ in aqueous solution forms sulfurous acid, the concentration of sulfites in the absorbent is generally sufficient without replenishment, but sulfites may be added, if necessary, to maintain a concentration of at least 0.05 to about 1 g-moles/l absorbent, preferably at least about 0.1 g-moles/l.

The absorbent solution of the present invention is useful for abating NO and $SO_2$ pollution gases which are a byproduct of combustion of fuels such as coal from flue gas streams. The process of the present invention may be employed on a gas stream wherein the $SO_2$ concentration of the stream may vary from about 10 ppm up to about 45 percent by volume and the NO concentration of the stream may vary from about 1 ppm to about 15,000 ppm by volume.

A fluid stream such as a flue gas is scrubbed with the absorbent solution in a contacting apparatus such as for example, a column or other conventional equipment for this purpose.

NO absorption in the present invention is thought to proceed by the following reactions:

Fe(II)EDTA + NO ⟶ Fe(II)EDTA(NO)

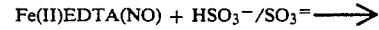
Fe(II)EDTA(NO) + HSO$_3^-$/SO$_3^=$ ⟶

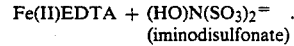
Fe(II)EDTA + (HO)N(SO$_3$)$_2^=$ .
(iminodisulfonate)

As a byproduct reaction, the chelate becomes oxidized by the reaction:

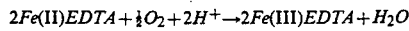
$2Fe(II)EDTA + \frac{1}{2}O_2 + 2H^+ \rightarrow 2Fe(III)EDTA + H_2O$ to produce a ferric chelate species unreactive to NO. Consequently, the spent chelate must be reduced to regenerate the chelate component for NO absorption. Oxidized metal chelates of the present invention are preferably reduced and regenerated at the cathode of an electrochemical cell.

The absorber column in the present process may be operated at a temperature of from about 0° to about 120°

C., but is preferably operated at a temperature of from about 5° to about 95° C. NO absorption is enhanced at reduced temperatures thereby allowing use of lower chelate concentration.

In the process, the absorber is typically operated at a pressure of from about atmospheric (e.g. 0 to about 69 Pa gauge) to about 10 atmospheres; however, atmospheric pressure is preferred for the convenience of lower equipment and operating costs.

The absorber column is preferably maintained at a pH between about 3 and about 8 to retain NO absorbance in the absorber. At a pH greater than 8, ferrous ions may precipitate from solution (e. g. ferrous and/or ferric hydroxide).

Electrochemical cells utilized in the present invention may have varying arrangements of electrodes, compartments and membranes as is known in the art for operating a reduction-oxidation cell. A simple two compartment cell is preferred for lower equipment costs including membrane area and operating costs.

The membrane preferably divides the cell into anode and cathode compartments wherein the catholyte comprises absorbent solution containing oxidized inactive metal chelates, sulfites and other soluble byproduct salts such as iminodisulfonate, sulfate and dithionate. The anolyte comprises an aqueous electrolytic solution, such as aqueous alkali metal salts and the like. A preferred anolyte in one embodiment of the invention is a base such as sodium hydroxide or a mixture of a base and salt such that the anolyte pH is maintained greater than 12.

The cell anode includes materials such as graphite, steel, nickel, titanium, tantalum, and the like. Anode materials may also comprise platinized metals, e. g. metals coated with metallic iridium, ruthenium and platinum, and the like or oxides thereof. Anode materials should operate at high current densities and be stable (i.e. corrosion resistant) in the operating environment. Platinum oxide and iridium oxide coated titanium and tantalum have been found to be suitable under most anode compartment environments. However, under basic operating conditions at a pH greater than 12, nickel and stainless steel anode materials have also been found to be suitable.

Cathode materials generally comprise graphite, steel, nickel, lead, and the like. Such electrode should operate at high current densities and be stable at the acidic to neutral pH operating conditions of the cathode compartment.

Membranes of varying types known in the art including ionic, bipolar, or non-ionic can be used. The choice of cell membrane typically depends upon design considerations, for example, promoting or preventing the diffusion of a particular species, either ionic or non-ionic and stability in the operating environment. If a strongly basic anolyte is used, diffusion of hydroxyl anions into the catholyte should be prevented. Alternately, when it is desired to promote electrodialysis of waste salt anions in the catholyte, a membrane allowing anion diffusion can be used.

Among the various cell membranes, non-ionic membranes typically have an advantage of reduced cost and greater durability compared to ionic exchange membranes. Cationic exchange membrane have an advantage of greater stability and enhanced durability compared to an anionic exchange membrane. In addition, cationic membranes exclude hydroxyl anions present in the strongly basic anolyte when nickel or stainless steel anodes are used in the cell. Anionic exchange membranes have the advantage of permitting the electrodialytic separation of waste sulfur/nitrogen salt anions from the chelate sorbent in the electrochemical cell.

Suitable ionic exchange membranes are typically fabricated from inert polymers radiation grafted with hydrophilic functionality then converted to the anion or cation as required. Representative examples include membranes such as aminated polystyrene, which are sold under the trade names IONICS by Ionics, Inc. or IONAC by Sybron, Inc; polyfluorohydrocarbons containing electronegative groups such as sulfonic acid functionality sold under the trade name NAFION by duPont; and crosslinked polyethylene or polytetrafluoroethylene films sold by RAI Research Corp. under the trade designation RAIPORE including R-1030 and R-5030 which are anionic and R-1010 and R-5010 which are cationic.

Several reactions occur in the electrochemical cell. At the anode, water or hydroxylion is oxidized:

$$4OH^- \rightarrow O_2 + 2H_2O + 4e^- \text{(alkaline conditions)}$$

$$2H_2O \rightarrow O_2 + 4H^+ + 4e^- \text{(acidic conditions)}$$

Other reactions in the anode compartment typically include:

$$2H^+ + SO_4^= \rightarrow H_2SO_4$$

$$H^+ + HSO_4^- \rightarrow H_2SO_4$$

$$2H^+ + (HO)N(SO_3)_2^{32} \rightarrow (HO)N(SO_3)_2H_2$$

At the cathode, electrons supplied by an outside power source reduce ferric chelates:

$$2Fe(III)EDTA + 2e^- \rightarrow 2Fe(II)EDTA$$

$$2H_2O + 2e^- \rightarrow 2OH^- + H_2$$

The electrochemical cell may have varying electrode materials and arrangements of compartments and membranes. A preferred configuration is a two-compartment cell separated by the exchange membrane. In one preferred embodiment, the two compartment cell has an anionic exchange membrane and platinized anode. In another preferred embodiment, the cell has a cationic exchange membrane and nickel or stainless steel anode operating in an anolyte pH greater than 12.

The waste salts formed by the absorption reaction may optionally be periodically purged from the absorbent solution by blowdown of the absorbent stream and addition of fresh absorbent. Since blowdown ordinarily results in the loss of chelate sorbents, a means for separating the sorbents from the waste salts may be used.

In one preferred embodiment, chelate sorbents may be separated from the waste salts by ultrafiltration. Ultrafiltration is generally used for separating polymeric chelate sorbents having a molecular weight greater than 2000, preferably greater than 500. Ultrafiltration typically comprises contacting an absorbent solution containing excess waste salts with a membrane in a membrane housing. Since the membrane is porous only for molecules having a lower molecular weight, the polymeric chelates are retained for recycle to the absorber. The salt filtrate passes through and is disposed of.

Suitable ultrafiltration membranes typically comprise a variety of synthetic polymers in the shape of a film, tube, or the like, wherein permeability of molecules having a molecular weight greater than about 500, for example, is low. A suitable membrane permeable by materials of up to about 2000 molecular weight is sold under the tradename SPECTRAPOR 6 by Van Waters & Rogers of San Francisco, CA. Other examples and details are described in P. R. Klinkowski, *Kirk-Othmer: Encyclopedia of Chemical Technology*, Vol. 23, pp. 439–461, which is incorporated herein by reference.

In another preferred embodiment, dialysis is used to separate chelate sorbents having a molecular weight less than 2000, preferably less than 500. However, dialysis may be used to separate waste salts from polymeric chelate sorbents as well. Dialysis, e. g. Donnan dialysis, typically comprises contacting the absorbent solution with a dialyzer. A Donnan dialysis unit in the present invention comprises a strong anionic exchange membrane separating a housing into dual compartments. In one compartment, an absorbent solution feed containing excess waste salts is contacted with one side of the membrane and a sulfite dialyzer countercurrently contacts an opposite side of the membrane. Waste salt anions diffuse into the dialyzer compartment and dialyzer anions such as sulfite anions diffuse into the feed solution. An equal exchange of anions is required to maintain electroneutrality on either side of the membrane. A dialysate having a lower concentration of waste salts is recycled to the absorber.

Preferred dialysis cell configurations include a two compartment arrangement and a shell and tube design. In this latter type cell, the anionic membrane comprises membrane tubes which are bundled together to provide a large surface area and compactness. The tube bundle is enclosed in the shell and the dialyzing solutions may flow either through the interior or around the exterior of the tubes according to practitioner preference. General aspects of shell and tube design are well known in the art. The only contact between fluids, in either configuration, is across opposing sides of the strong anionic membrane.

Dialysis membranes and additional details of separation methods are described in E. F. Leonard, *Kirk-Othmer: Encyclopedia of Chemical Technology*, Vol. 7, pp. 564–579, which is also incorporated herein by reference. Generally, membranes used in a Donnan dialysis cell are similar to those previously described for use in the electrochemical cell. R-1030 is a preferred strong anionic Donnan dialysis membrane.

Donnan dialysis and ultrafiltration are preferably conducted at atmospheric pressure at a temperature between about 5° C. and about 95° C., more preferably between about 20° C. and about 70° C. Where necessary, a depressurization vessel may be used to degas the absorbent stream prior to either ultrafiltration or dialysis.

To maintain the absorber column pH between about 3 to about 8, the $SO_2$ concentration of the inlet flue gas may be enhanced. Alternatively, an acid solution may be pumped into the recycle absorbent solution.

The following examples illustrate the use of the absorbent in the present invention:

EXAMPLE 1

An absorbent solution comprising ferrous EDTA chelate and sodium sulfite was circulated through an electrochemical cell. The cell was operated using a nickel anode and base anolyte. The effect of the anode environment on the anode was evaluated by monitoring nickel concentration of the anolyte. Catholyte pH was monitored to determine whether significant hydroxyl ion migration into the catholyte would occur. (At a pH > 8, iron ions might precipitate from solution.)

Four liters of 0.01 M FeEDTA (VERSENE photo chelate) and 0.5 M sodium sulfite having a pH of 6.65 were circulated through the cathode compartment of the electrochemical cell at 1000 ml/min. One liter of 1 M sodium hydroxide was circulated through the anode compartment of the cell at 1000 ml/min. A NAFION 324 cationic exchange membrane was used. Current was provided by a Hewlet-Packard DC power supply. The electrochemical cell was made of plexiglass with an anode made from 7.6×7.6 cm expanded nickel and a cathode made from 7.6×7.6 cm porous nickel welded to an expanded nickel backing. Oxidized chelate was supplied by sparging the reduced chelate solution with air. In this manner a continuous operation was maintained for the length of the tests. Results are shown in Table I. Anode corrosion was not a problem and iron was not precipitated in the cathode compartment.

TABLE I

| Run Time (min) | Volts | Amps | Conc. $Fe^{+2}$ (M) | Conc. $Fe^{+3}$ (M) | Conc. Ni (ppm) | pH |
|---|---|---|---|---|---|---|
| 0 | | | 0.0006 | 0.0106 | 0.362 | 6.65 |
| 3 | 3.8 | 4.0 | 0.0050 | 0.0046 | | 6.64 |
| 6 | 3.8 | 4.0 | 0.0073 | 0.0014 | | 6.66 |
| 9 | 3.7 | 4.0 | 0.0089 | 0.0003 | | 6.50 |
| 15 | 1.75 | 0.5 | 0.0083 | 0.00005 | | 6.43 |
| 27 | 1.90 | 1.5 | 0.0083 | 0.00002 | | 6.45 |
| 45 | 1.85 | 1.15 | 0.0082 | 0.00003 | | 6.45 |
| 60 | 1.95 | 1.60 | 0.0087 | 0 | | 6.45 |
| 80 | 1.95 | 1.60 | 0.0087 | 0 | | 6.47 |
| 95 | 1.95 | 1.60 | 0.0087 | 0 | | 6.47 |
| 110 | 1.99 | 1.60 | 0.0087 | 0 | | 6.48 |
| 120 | 2.00 | 1.60 | 0.0087 | 0 | 0.261 | 6.49 |

EXAMPLE 2

In the following example, the apparatus from Example 1 was similarly operated except that the base anolyte concentration was increased to 25 weight percent NaOH solution. Nickel concentration analysis was monitored beginning at the point at which $Fe^{+3}$ concentration was below detection (approximately 60 minutes after the test began).

Results are shown in Table II. Corrosion of the anode was negligible and there was no pH fluctuation in the catholyte which otherwise might precipitate iron from solution.

TABLE II

| Run Time (min) | Volts | Amps | Conc. $Fe^{+2}$ (M) | Conc. $Fe^{+3}$ (M) | Conc. Ni (ppm) | pH |
|---|---|---|---|---|---|---|
| 60 | 1.5 | 1.3 | 0.0088 | 0 | 0.922 | 6.53 |
| 90 | 1.5 | 1.3 | 0.0088 | 0 | | 6.50 |
| 120 | 1.5 | 1.3 | 0.0088 | 0 | 1.132 | 6.50 |
| 150 | 1.5 | 1.3 | 0.0088 | 0 | | 6.50 |
| 180 | 1.5 | 1.3 | 0.0088 | 0 | 1.275 | 6.50 |

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A process for abating nitric oxide and sulfur dioxide from a flue gas, comprising the steps of;
   (a) contacting flue gas with an absorbent solution, in an absorption stream comprising a reduced metal chelate and a sulfite to absorb sulfur dioxide and nitric oxide from said flue gas to form an oxidized chelate absorbent solution;
   (b) directing said oxidized chelate absorbent solution to a cathode compartment in an electrochemical cell having a corrosion resistant nickel or stainless steel anode in an anolyte solution having a pH greater than 12 in an anode compartment separated by a cationic membrane from a cathode in said cathode compartment and imposing an electrical potential across said anode and said cathode to reduce said oxidized chelates in said cathode compartment to obtain a regenerated absorbent solution; and
   (c) recycling said regenerated absorbent solution to said contacting step.

2. The process of claim 1, wherein a molecular ratio of chelant to metal ion is between about 1.2 to about 10 to 1.

3. The process of claim 2, wherein said ratio of chelant to metal ion is between about 2 to about 5 to 1.

4. The process of claim 1, wherein said anode comprises platinum coated titanium or tantalum.

5. The process of claim 1, wherein said membrane comprises a non-ionic exchange membrane.

6. The process of claim 1, further comprising the steps of removing a side stream of said absorbent solution, separating said chelates from soluble waste sulfur/nitrogen salts to reduce said salt concentration in said absorbent and recycling said separated chelates to said absorbent stream.

7. The process of claim 6, wherein said chelates comprise polymeric chelates and said separating step further comprises contacting said side stream absorbent solution with an ultrafiltration membrane wherein said filtrate has a low concentration of said polymeric chelates.

8. The process of claim 6, wherein said separating step further comprises contacting one surface of an anionic Donnan dialysis membrane with said side stream absorbent solution and contacting an opposite surface of said membrane with a dialyzing solution wherein a dialysate has lower concentration of said waste salts.

9. The process of claim 8, wherein said dialyzing solution comprises an aqueous sulfite solution.

10. The process of claim 1, further comprising adjusting said regenerated absorbent solution to a pH of from about 3 to about 8 for said recycling step.

11. An apparatus for the absorption of $SO_2$ and NO from flue gases comprising;
   (a) an absorber column;
   (b) an absorbent solution comprising a metal chelate and sulfites; and
   (c) an electrochemical cell comprising a nickel or stainless steel anode, an anolyte solution having a pH greater than 12 and a cationic exchange membrane.

12. The apparatus of claim 11, wherein said chelate comprises a polymeric chelate and said apparatus further comprises a housing and an ultrafiltration membrane.

13. The apparatus of claim 11, further comprising a housing, a strong anionic Donnan dialysis membrane, and a sulfite dialyzing solution for separating waste sulfur/nitrogen salts from said absorbent solution.

14. A process for abating nitric oxide and sulfur dioxide from a flue gas, comprising the steps of;
   (a) contacting flue gas with an absorbent solution, in an absorption stream comprising a reduced metal chelate and a sulfite to absorb sulfur dioxide and nitric oxide from said flue gas to form an oxidized chelate absorbent solution;
   (b) directing said oxidized chelate absorbent solution to a chathode compartment in an electrochemical cell having a corrosion resistant anode in an anolyte solution in an anode compartment separated by a non-ionic membrane from a cathode in said cathode compartment;
   (c) imposing an electrical potential across said anode and said cathode to reduce said oxidized chelates in said cathode compartment to obtain a regenerated absorbent solution; and
   (d) recycling said regenerated absorbent solution to said contacting step.

* * * * *

UNITED STATES PATENT AND TRADEMARK OFFICE
CERTIFICATE OF CORRECTION

PATENT NO. : 5,320,816
DATED : June 14, 1994
INVENTOR(S) : Susan S. Tsai et al.

It is certified that error appears in the above-indentified patent and that said Letters Patent is hereby corrected as shown below:

In claim 14, column 12, line 34, "chathode" should read --cathode--.

Signed and Sealed this

Twenty-first Day of November, 1995

Attest:

BRUCE LEHMAN

*Attesting Officer*   *Commissioner of Patents and Trademarks*